April 16, 1963        G. VANDE SANDE        3,086,196
PULSED ULTRASONIC DETECTOR
Filed Oct. 10, 1960        3 Sheets-Sheet 1
FIG. IA.
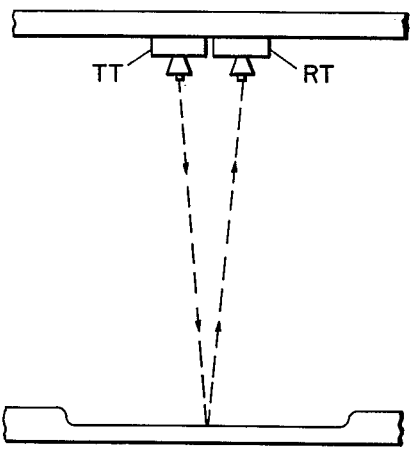
FIG. IB.
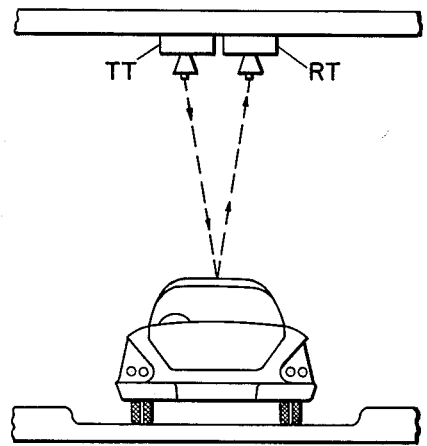
INVENTOR.
G. VANDE SANDE
BY
HIS ATTORNEY April 16, 1963 G. VANDE SANDE 3,086,196
PULSED ULTRASONIC DETECTOR
Filed Oct. 10, 1960 3 Sheets-Sheet 2

INVENTOR.
G. VANDE SANDE
BY
HIS ATTORNEY

April 16, 1963   G. VANDE SANDE   3,086,196
PULSED ULTRASONIC DETECTOR
Filed Oct. 10, 1960   3 Sheets-Sheet 3

GATED DETECTION AND RELAY CONTROL CIRCUITS

INVENTOR.
G. VANDE SANDE
BY
Forest B. Hitchcock
HIS ATTORNEY

United States Patent Office 3,086,196
Patented Apr. 16, 1963

3,086,196
PULSED ULTRASONIC DETECTOR
George Vande Sande, Bethesda, Md., assignor to General Railway Signal Company, Rochester, N.Y.
Filed Oct. 10, 1960, Ser. No. 61,457
8 Claims. (Cl. 340—38)

This invention relates to the detection of objects and especially vehicles and more particularly pertains to such systems wherein the objects or vehicles are detected as a result of the effects produced by their passing through a beam of sound energy. This invention is analogous in subject matter to, and is an improvement over, what is disclosed and claimed in the prior application of H. C. Kendall et al., Serial No. 808,736, filed April 24, 1959, now U.S. Patent 3,042,303, and of J. H. Auer, Jr., Serial No. 30,667, filed May 20, 1960, both of which are assigned to the assignee of the present invention.

In the systems disclosed in these two prior applications, a beam of repetitive sound pulses is directed across the path of each object or vehicle. A receiver is included which has a sound transducer so positioned and directed that it is responsive to the reflections of each sound pulse from the vehicle as it intercepts the transmitted sound beam. The transmitted sound beam is additionally so directed and the receiving transducer so positioned that, in the absence of a vehicle, the transmitted sound energy is instead reflected from a fixed reflecting surface which is more remote than the vehicle back to the receiving transducer. The sound can impinge upon this fixed reflecting surface only when no vehicle is present, since the vehicle when present blocks the sound beam. Such an arrangement is readily provided by positioning both transmitting and receiving transducers over a line of traffic and directing both downwardly so that the transmitted sound beam is directed toward and reflected from the top of each passing vehicle when it is within the beam but is instead reflected from the pavement when no vehicle is present.

Because of the considerably longer propagation time which is involved when a sound pulse is reflected from the pavement rather than from the top of a passing vehicle, each pavement reflection pulse is received at a later time with respect to the transmitted pulse than is the vehicle reflection pulse. Electronic gating circuits are used in the systems of these prior applications which demarcate successive time intervals following the transmission of each sound pulse, and these gating circuits make it possible to distinguish a pavement reflection from a vehicle reflection. Incidentally, the repetition rate of the transmitted sound pulses is made sufficiently slow to permit each sound pulse to be received by the receiving means following its reflection from a vehicle within the designated detection zone prior to the transmission of the next sound pulse. This requirement eliminates ambiguity since it relates each reflection pulse definitely to the last transmitted pulse.

The prior application Serial No. 808,736, in particular, discloses how it is possible to achieve a very high degree of accuracy in vehicle detection so as to discriminate clearly between the desired vehicles to be counted and other extraneous objects. This is brought about, in part, by so organizing the system that a single count can be registered only by going through a prescribed cycle of events. Such cycle comprises: first, the reception of reflections from the top of a passing vehicle concurrently with the interruption of sound reflections from the pavement at the time the vehicle enters the sound beam; and second, the re-establishment of pavement reflections concurrently with the interruption of the previously received vehicle reflection pulses. The dual requirement that both vehicle reflections be received and pavement reflections be concurrently interrupted is of considerable effect in eliminating spurious responses which might otherwise result from the passage of people or animals, for example, through the detection zone. Thus, a person passing through the beam might very well be able to reflect an occasional pulse back to the receiving transducer, but it is not likely that such person could at the same time entirely block the sound beam so as to prevent all reflections from the pavement. Such a system also provides that a vehicle having a plurality of sound reflecting surfaces spaced by non-reflecting surfaces (a convertible car, for example) will be counted as a single vehicle, rather than as two separate vehicles corresponding to each of the spaced sound reflecting surfaces; in other words, the failure of the pavement reflections to be received when the cloth top is within the sound beam prohibits the restoration of the registering means to its normal condition so that the subsequent recurrence of vehicle reflections is not identified as coming from a second vehicle.

In the prior systems of this general type, it has been deemed necessary to provide a plurality of electronic timing circuits to demarcate the respective intervals during which vehicle and pavement reflections can be expected. In the prior applications, Serial No. 808,736, referred to previously, the timing circuits each demarcate a successive interval, with the first timing circuit set into operation at the time of transmission of a sound pulse. Each timing circuit after the first is set into operation at the instant that a previous timing circuit has completed its timing operation. One of these timing circuits during its timing operation demarcates the particular interval throughout which vehicle reflection pulses can be expected, and a separate timing circuit similarly demarcates subsequently a respective interval through which pavement reflection pulses can be expected.

Separate amplifiers are provided for the pavement and vehicle reflection pulses and each has applied to it a signal corresponding to that received by the receiving transducer so that each, of course, receives both the pavement and vehicle reflections. The timing circuits just described selectively gate these two amplifiers, permitting the vehicle reflection amplifier to be operative only throughout the time that vehicle reflection pulses can be expected and similarly permitting the pavement reflection amplifier to be operative only throughout the time that pavement reflections can be expected. As a result when no vehicle is present, the pavement reflection amplifier produces an output signal for each transmitted sound pulse, but no output signal is, under these circumstances, obtained from the vehicle reflection amplifier. On the other hand, when a vehicle is present, the conditions are reversed in that there is then no output signal from the pavement reflection amplifier, but an output pulse is instead obtained from the vehicle reflection amplifier for each sound pulse that is transmitted. An output circuit is distinctively operated in accordance with which one of these two conditions is existent at any time and thereby provides a distinctive indication of the passage of a vehicle through the sound beam.

From the foregoing description it becomes apparent that a considerable amount of electronic circuitry must be employed not only to generate the sound pulses but also to distinguish between the pavement and vehicle reflection pulses. It is, therefore, desired by this invention to provide a vehicle detector system having all the desirable attributes of the system just described but to accomplish this with a less complex organization.

Described briefly, it is contemplated by the present invention to provide all of the functions normally provided by the various timing circuits by a delay line which may be either an electronic delay line or an acoustic delay line, although the latter is the one which is illustrated herein and is the type toward which the description is directed. The delay line is energized at one end thereof each time that a sound pulse is transmitted. The delay line is constructed so that the total delay time that it provides at least equals the round trip propagation time of a sound pulse from the transmitting transducer to the pavement and back to the receiving transducer.

When an acoustic delay line is used, it is possible to position a plurality of quite closely spaced transducers along a predetermined length of the line and parallel and also integrate their outputs so that their common output will then comprise a voltage whose duration will encompass the expected reception time of pavement reflection pulses at the receiving transducer. A second plurality of transducers may then be positioned along the line at a different location such that their successive outputs when paralleled and integrated will similarly encompass the expected reception time of vehicle reflection pulses at the receiving transducer. These two output signals will then represent respectively pavement and vehicle gating voltages which may be respectively applied to two different amplifiers, both of which have applied thereto a signal representing the output of the receiving transducer. Ordinarily, the output of the receiving transducer will represent an echo pulse from either the pavement or from a vehicle, depending upon whether or not a vehicle is within the sound beam. Because of the gating effect of the signals obtained from the delay line, one of the amplifiers will produce an output signal for each received vehicle reflection pulse and the other will similarly produce an output signal for each pavement reflection pulse.

In the preferred embodiment, the output pulses of the vehicle reflection amplifier are applied to one input of a flip-flop, and the output of the pavement reflection amplifier is similarly applied to the other input of the same flip-flop. Accordingly, when no vehicle is present, the flip-flop receives successive input pulses only from the pavement reflection amplifier and thus it remains steadily in one of its two distinctive conditions. When a vehicle is present, on the other hand, the pavement reflection pulse that then occurs results in an input being applied to the other input of the flip-flop, causing it to be operated to its opposite condition. Circuit means is associated with the flip-flop to detect the particular one of the two conditions it is in at any time and then control an associated relay accordingly so that the relay is operated once for each vehicle passing through the sound beam.

Alternative embodiments are also disclosed herein which do not utilize both the vehicle and the pavement reflection pulses. Thus, it will be apparent that vehicles may readily be detected when only the vehicle reflection pulses are used. As long as these can be distinguished from the pavement reflection pulses, the reception of the vehicle reflection pulses can be used to operate a relay or any other suitable two-state device and thus indicate the presence of a vehicle. In a similar way, it is possible to detect a vehicle only by using the pavement reflection pulses. Thus, as long as these can readily be detected and distinguished from the vehicle reflection pulses, it is possible to detect a vehicle merely by the absence of the normally received pavement reflection pulses such as occurs when a vehicle intercepts the beam and prevents the sound pulses from impinging upon the pavement. Although the unusually high degree of discrimination that is obtained when both vehicle and pavement reflection pulses are used is not fully realized in either of these two latter embodiments, it has, nevertheless, been found that the operation of the system may under some circumstances not be seriously affected so that its use becomes eminently practical.

It is thus an object of the present invention to provide a vehicle detection system wherein the discrimination between vehicle and pavement reflection pulses is effected in a greatly simplified manner not requiring the use of any electronic timing circuits involving capacitor time measuring circuits.

Another object of this invention is to provide a vehicle detection system wherein sound pulses reflected from the vehicles to be detected are distinguished from other sound pulses on the basis of their time of reception and wherein a delay line is used to demarcate the expected time of reception of such reflection pulses.

Other objects, purposes and characteristic features of this invention will in part be obvious from the accompanying drawings and will in part be pointed out as the description of the invention progresses.

To simplify the illustration, the various parts and circuits constituting the several embodiments of the invention are shown diagrammatically and certain conventional circuits and elements are illustrated in block form. The symbol (B+) and the symbol for a ground indicate connections made to the positive and negative terminals respectively of a source of suitable voltage for the operation of various electronic tubes and the like.

In describing the invention in detail, reference will be made to the accompanying drawings in which like reference characters indicate corresponding parts in the several views, and in which:

FIGS. 1A and 1B illustrate a possible arrangement of the receiving and transmitting transducers;

FIG. 1A illustrates the manner in which the receiving and transmitting transducers RT and TT, respectively, may be positioned over a roadway and both directed downwardly. In the absence of any vehicles, the sound pulses emanating from the transmitting transducer TT impinge upon the pavement and are then reflected back toward the receiving transducer RT as shown in FIG. 1A. FIG. 1B illustrates the reflection of the sound pulses from the top of a passing vehicle when it is within the beam and shows that reflections of these pulses are also returned to the receiving transducer and that they have an appreciably shorter round-trip propagation path and a correspondingly shorter propagation time.

Figure 2:
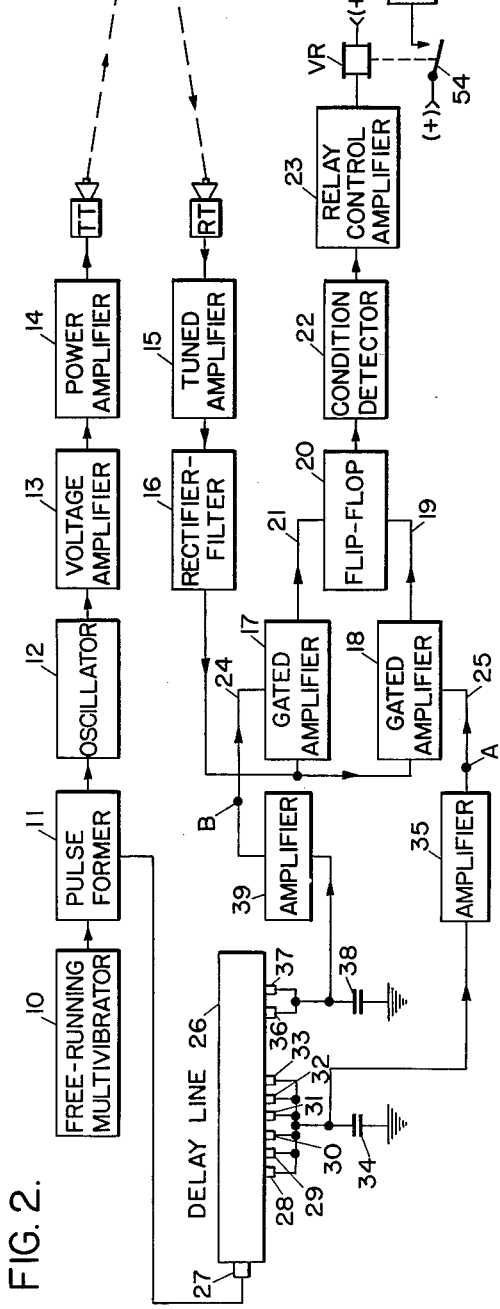
FIG. 2 illustrates in block diagram form one embodiment of this invention.

In the block diagram of FIG. 2 the sound pulse transmitting means includes a free-running multivibrator 10 whose frequency of operation establishes the sound pulse repetition rate of the system. A repetition rate of twenty sound pulses per second has been found to be suitable. This rate provides pulse period of fifty milliseconds and this is generally long enough so that a sound pulse can be received from the most distant reflecting surface prior to the transmission of the next sound pulse.

The output of the multivibrator is applied to a pulse former 11 which provides a unidirectional output pulse of predetermined duration each time that the multivibrator 10 is operated to a particular one of its two distinctive conditions. This output pulse of the pulse former 11, which may have a duration in the order of one millisecond, is applied to the oscillator 12 and sets this oscillator into operation. The oscillator may include an electron tube which is normally maintained in a cut-off condition, but is permitted to conduct only in response to the unidirectional pulse obtained from pulse former 11. In another embodiment of this invention, as particularly illustrated in the previously mentioned application Serial No. 808,736, the oscillator includes an electron tube having a parallel resonant tuned circuit in its cathode circuit. The tube is normally conductive but is cut off by the pulse from the pulse former 11 and during this cut-off period the tuned circuit oscillates so that an alternating current signal at the predetermined oscillator frequency, which may be in the order of 20 kc., is applied to the voltage amplifier 13. The voltage amplifier 13 amplifies the signal and applies it to the power amplifier 14 whose output is connected to the transmitting transducer TT. Therefore, for each cycle of the multivibrator 10, a brief pulse of sound energy is transmitted by the transmitting transducer TT and directed toward the passing vehicles.

Reflected sound pulses which impinge upon the receiving transducer RT are converted to electrical energy which is amplified by the tuned amplifier 15. This tuned amplifier is tuned so that it will readily amplify reflection pulses having the frequency of the transmitted sound pulses but at the same time it tends to reject extraneous sound energy which occurs at other frequencies. The output of the tuned amplifier 15 comprises a brief alternating current signal for each received sound pulse. This signal is both rectified and filtered by the rectifier-filter 16 so that a unidirectional filtered voltage pulse is applied to the inputs of both the gated amplifiers 17 and 18 for each received sound pulse. In one specific embodiment of this invention, the rectifier-filter 16 is so organized that these input pulses to the amplifiers 17 and 18 are of negative-going polarity.

The amplifiers 17 and 18 are selectively gated so that each can respond only to input pulses applied thereto during a predetermined respective time interval following the transmission of a sound pulse. More specifically, the amplifier 17 is gated so that it can provide an output pulse only in response to an input pulse occurring during a particular time interval following the transmission of the last sound pulse which encompasses the expected time of reception of a pavement reflection pulse. In a similar manner, amplifier 18 is gated in such a way that it can provide an output pulse in response to an input pulse applied thereto only if it occurs during a different predetermined time interval following the transmission of the last sound pulse, which time interval encompasses the expected reception time of vehicle reflection pulses. The result, therefore, is that the amplifier 18 supplies an input over wire 19 to the flip-flop 20 for each received vehicle reflection pulse so that, when a vehicle is present within the sound beam, the flip-flop 20 receives such transmitted sound pulse. On the other hand, the flip-flop 20 receives an input over wire 21 from amplifier 17 for each pavement reflection pulse. It therefore receives an input for each transmitted sound pulse whenever there is no vehicle present within the sound beam so that each transmitted sound pulse can impinge upon and be reflected from the pavement.

The flip-flop 20 is therefore steadily in one of its two distinctive conditions whenever a vehicle is present and in the other of its two distinctive conditions when no vehicle is present. The condition detector 22 is so organized as to sense this condition of the flip-flop 20. When it has sensed that the flip-flop is in a first of its two conditions it acts upon the relay control amplifier 23 to control relay VR to a particular distinctive condition. Similarly, when the condition detector 22 senses that the flip-flop is in the opposite of its two distinctive conditions, it acts upon the relay control amplifier 23 to control relay VR to the other of its two distinctive conditions. Therefore, relay VR goes through a cycle of operation for each vehicle passing through the sound beam.

The high degree of discrimination against spurious objects referred to in connection with the prior application Serial No. 808,736 is here also achieved by the condition detector 22. More specifically, if the flip-flop 20 receives alternate inputs from both amplifiers 17 and 18, it will operate alternately between its opposite conditions, but when this occurs the condition detector 22 does not operate the relay VR from its last-operated condition. Because of this, it is required that in order for the relay VR to be actuated and thereby indicate the presence of a vehicle in the sound beam, that not only must the vehicle reflection pulses be received but the pavement reflection pulses must concurrently be prevented from being received. Moreover, upon the departure of the vehicle from the sound beam, it is necessary that pavement reflection pulses be again received but without at the same time having vehicle reflection pulses occur since only in this way can the flip-flop 20 be operated to and remain in the opposite condition so that the condition detector 22 will be able to restore relay VR to its normal condition.

The amplifiers 17 and 18 are each gated by applying to them gating voltages over wires 24 and 25 respectively. These gating voltages are obtained from a delay line 26 which is energized at the time of transmission of each sound pulse. Electrical delay lines may well be used for this purpose, but in the illustrated embodiment of this invention, an acoustic delay line is used, particularly because of its stability over long periods of time. The delay line may be formed of various kinds of materials, but it is of course desirable to select the material from that group which has both a relatively slow sound propagation rate and also provides relatively low attenuation characteristics.

A transducer 27 is affixed to one end of the delay line and is energized by a sound pulse obtained from the pulse former 11. As a result, a sound pulse is caused to travel down the delay line, starting always at approximately the time of transmission of each sound pulse from the transmitting transducer TT. Positioned along the axial length of the transducer are a number of sound transducers 28–33, each of which has a voltage induced therein when the sound pulse has traveled to the point along the line at which the particular transducer is located. The transducers 28–33 are quite closely spaced along the length of the line and have their outputs all connected together and to the upper terminal of an integrating capacitor 34. As the sound pulse travels along the delay line, a voltage is induced first in the transducer 28 and this charges capacitor 34. The next transducer 29 is sufficiently closely spaced to the transducer 28 that it will produce an output signal in response to the advancing sound pulse prior to the cessation of the output signal from transducer 28 and this will tend to maintain the voltage across the integrating capacitor 34. In a similar manner, as the sound pulse continues its progress along the delay line 26, the various transducers 28–33 in succession produce electrical output signals which tend to maintain a charge across capacitor 34. The result is that the voltage at the upper terminal of this capacitor 34 is steadily maintained at a predetermined value throughout the time that it takes for the sound pulse to rtavel from the vicinity of the first transducer 28 until it has passed the last of these transducers 33. The segment of the delay line 26 over which these transducers 28–33 are placed is so related to the velocity of sound propagation through the delay line 26 that the resulting voltage across capacitor 34 is maintained throughout that time interval which encompasses the expected reception time of vehicle reception pulses. This voltage is amplified by the amplifier 35 whose output is then applied over wire 25 to the gating input of gated amplifier 18. As previously described, this gating input makes it possible for the amplifier 18 to provide an output signal only for those reflected sound pulses which represent vehicle reflection pulses.

Positioned further along the length of the delay line are several additional transducers 36 and 37 whose outputs are also connected in parallel to the upper terminal of an integrating capacitor 38. In a manner similar to that just described, a voltage appears across the capacitor 38 throughout the time that the sound pulse traveling along the delay line 26 passes these transducers 36 and 37. These two transducers are so placed along the line that their output when paralleled and integrated by capacitor 38 will encompass the expected reception time of pavement reflection pulses. This voltage is applied to an amplifier 39 whose output is then applied over wire 24 to the gating input of amplifier 17. Because of this, amplifier 17 can only produce an output signal in response to reflection pulses which represent pavement reflection pulses. It will be noted that a smaller number of transducers, spread over a shorter length of the line, is needed to provide the pavement reflection gate as compared to the larger number required to generate the vehicle reflection gate. The reason for this is that the round-trip propagation time of a pavement reflection pulse is generally fixed since it is principally dependent upon the height of the transducers above the pavement and is thereafter affected only by temperature variations and the like. Therefore, the pavement reflection gate can be quite narrow and it is indeed preferably that it be narrow in order that all stray reflections which are not actual pavement reflections be discriminated against and be prevented from operating the flip-flop 20. On the other hand, the vehicle reflection gate must be of considerably longer duration since varying heights of vehicles tend to affect substantially the propagation time of a vehicle reflection pulse.

For convenience in illustration, the delay line 26 has been shown as straight, but it will be understandable to those skilled in the art that it may be preferable to fold the line 26 once or more times or to construct it in spiral fashion so as to conserve space. Although the various design constants of such a delay line can readily be determined by one having knowledge thereof, it can be seen that the length of the line must be such that the total delay, i.e. the time of pulse transmission from the end where transducer 27 is located to the end adjacent the last transducer 37, must at least equal the round-trip propagation time of a sound pulse from the overhead transducers to the pavement and back. More specifically, when the transducers are mounted 20 feet above the pavement, then, if it is assumed that the rate of sound pulse transmission is approximately one foot per millisecond, the over-all delay of the line must be in the order of 40 milliseconds.

Figure 3:
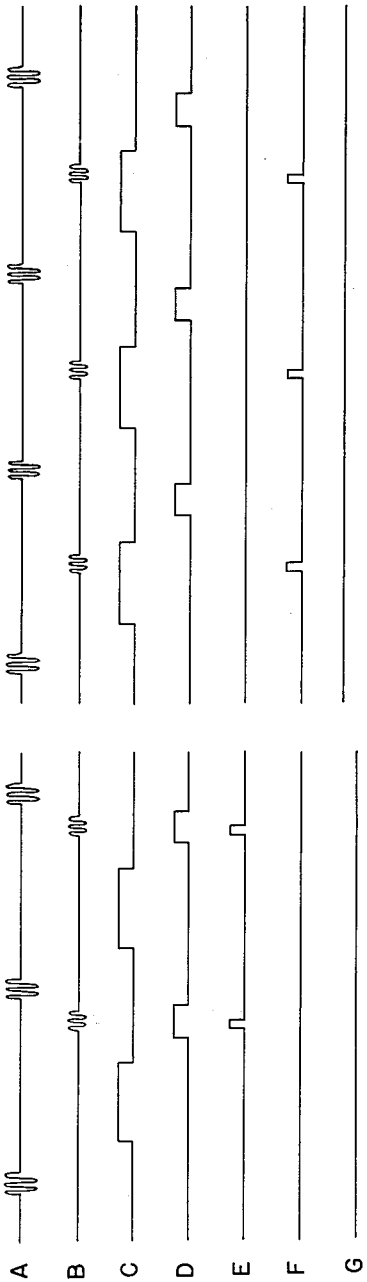
FIG. 3 is a wave form diagram illustrating certain phase and time relationships involved in the system.

The wave form diagram of FIG. 3 further clarifies the mode of operation of the system. The left-hand portion of this wave form diagram shows conditions that exist when no vehicle is present within the sound beam; whereas the right-hand portion of this figure shows the conditions that exist when a vehicle is present. Line A of FIG. 3 illustrates the transmission of the repetitive sound pulses. It will be appreciated that the drawing is not to scale since in actual practice each sound pulse may be of only one millisecond duration but with the interval between successive pulses being approximately 50 milliseconds, i.e. at least as long as the round-trip propagation time of a sound pulse from the transducers to the pavement and back again to the transducers.

Line B illustrates the output of the receiving transducer as it responds to the reflection pulses. In the left-hand portion, the reflection pulses are each shown as occurring quite late in the cycle since these are pavement reflection pulses that are received when no vehicle is present to block the sound beam. On the other hand, when a vehicle is present, the right-hand portion of FIG. 3 shows that each reflection pulse occurs much earlier in each cycle. Line C illustrates the gating voltage which is provided by the delay line across capacitor 34 and which thus represents the vehicle gate. Line D similarly represents the shorter pavement gate. Line E illustrates the output pulses that are provided by amplifier 18 in response to a reflection pulse occurring during the existence of the pavement gating voltage shown at line D. The right-hand portion of FIG. 3 shows that these output pulses of line E do not occur when a vehicle is present. Instead, line F shows that each vehicle reflection pulse produces an output pulse from amplifier 17. Line G illustrates the operation of the flip-flop; it is in one of its two conditions when no vehicle is present and in the opposite condition when a vehicle is present.

Figure 4:
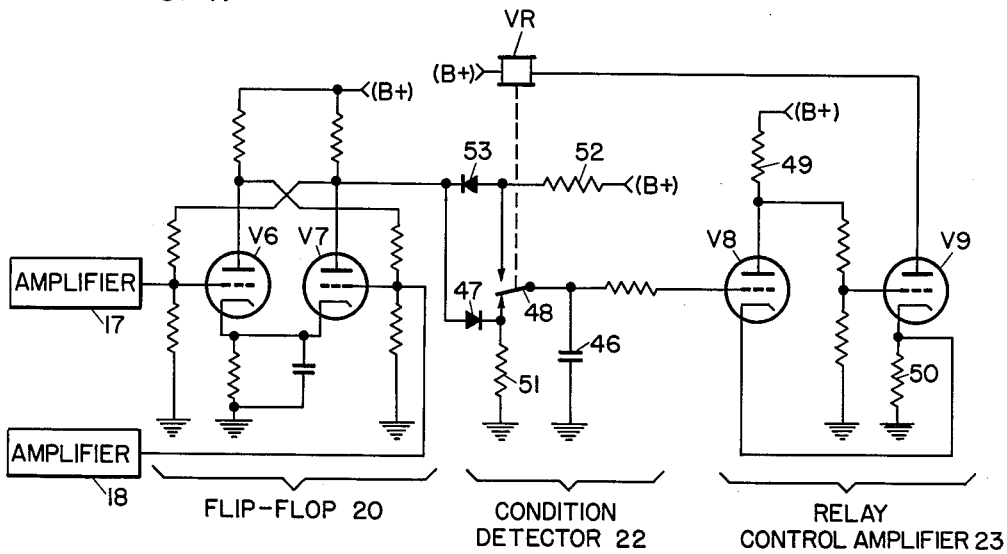
FIG. 4 illustrates one possible embodiment of the circuit means provided for detecting whether pavement or vehicle reflections are at any time being received.

FIG. 4 illustrates the circuit organization which may be used to detect whether repetitive output pulses are being obtained from amplifier 17 or from amplifier 18 and thus indicate whether or not a vehicle is present within the sound beam. The flip-flop 20 is shown in this FIG. 4 as including two interconnected electron tubes. Because of the feed-back connections between the two tubes, the flip-flop has two stable conditions and operates almost instantaneously from one to the other, in response to input pulses obtained respectively from amplifiers 17 and 18. More specifically, the amplifiers 17 and 18 are both organized to provide a positive-going voltage pulse to the respective grids of tubes V6 and V7. Whenever no vehicle is present so that successive positive-going pulses are obtained from amplifier 17, tube V6 has its grid driven positively by each such pulse and the flip-flop therefore remains in the state wherein tube V6 is fully conductive and tube V7 is fully cut off. If, on the other hand, a vehicle enters the sound beam, then positive-going pulses are no longer obtained from amplifier 17 but they are instead then obtained repeatedly from amplifier 18. As a result, the flip-flop is operated to the opposite stable state wherein tube V7 is fully conductive and tube V6 is cut off.

Whenever the flip-flop is in the first of the stable states just described, the voltage at the plate of tube V7 is at a high level because of the non-conductive condition of this tube. Because of this condition, capacitor 46 is charged to a relatively high positive potential through diode 47 and through back contact 48 of relay VR so that the grid of tube V8 is driven to the conductive region. Its plate voltage is then reduced substantially because of the large voltage drop across plate resistor 49 with the result that the grid voltage of tube V9 is sufficiently reduced with respect to its positive cathode that relay VR in the plate circuit of tube V9 will drop away. At this time, the cathode of tube V9 is maintained at a positive potential because of the flow of the plate cathode current of tube V8 through its cathode resistor 50.

If it is now assumed that a vehicle is just in the process of entering the beam of repetitive sound pulses, then it is quite likely that the receiving transducer will, for a brief interval receive both vehicle reflection pulses and pavement reflection pulses. In other words, there is a brief interval of time as the vehicle enters the sound beam when vehicle reflection pulses are received by the receiving transducer but pavement reflection pulses are still also being received since the vehicle has not yet moved fully into the position where it is able to block the sound beam entirely from impinging upon the pavement. At such time, both amplifiers 17 and 18 will produce repetitive output pulses and these will alternately be applied to the grids of tubes V6 and V7, thereby causing the flip-flop to operate alternately from one stable state to the other going through a complete cycle for each revolution of the drum. Tube V7 will then alternately shift between conductive and nonconductive conditions so that its plate voltage will vary alternately between predetermined low and high values.

When the plate voltage of tube V7 has steadily been at the higher level so that relay VR is dropped away, and thereafter is abruptly decreased in value for a brief interval, there can be but little effect upon the high level of charge stored in capacitor 46. The reason for this is that any discharging current through tube V7 then encounters the high back resistance of rectifier 47. However, each time that tube V7 is momentarily operated again to the nonconductive state, capacitor 46 can quickly regain any charge it might have lost because the charging current there encounters only the low forward resistance of diode 47. When relay VR is dropped away, as is now assumed, resistor 51 also provides a discharge path for capacitor 46, but this discharge path has a time constant which is several times the period of operation of flip-flop 20 so that it can produce only a slight decrease in charge on capacitor 46 each time that tube V7 becomes conductive. From this it will be apparent that when capacitor 46 has become positively charged in the manner just described by reason of tube V7 having been for a time cut off, any rapid alternation of states of flip-flop 20 will not appreciably affect the charge on capacitor 46 and thus will not result in operation of relay VR.

If it is now assumed that the vehicle is fully within the beam of the transmitted sound pulses, then positive-going output pulses can no longer be obtained from amplifier 17 but they are then repeatedly obtained from the output of amplifier 18. The flip-flop 20 then remains in the state wherein tube V7 is fully conductive so that its plate voltage becomes and remains at a low level. Capacitor 46 can then discharge through resistor 51 to which its upper terminal is connected through back contact 48 of relay VR. Thus, if flip-flop 20 remains in the state wherein tube V7 is conductive for any substantial length of time, capacitor 46 discharges through resistor 51 until eventually the voltage at its upper terminal reaches a level where the plate current of tube V8 approaches or perhaps even reaches the cut-off level. As this happens, its plate voltage rises and causes the grid voltage of tube V9 to overcome its positive cathode bias. This, in turn, increases the plate current of tube V9 to a value where relay VR will pick up.

The picking up of relay VR closes its front contact 48 so that the upper terminal of capacitor 46 is now connected through resistor 52 to the (B+) voltage source. A low resistance discharge path is now provided for capacitor 46 through diode 53 and the low resistance plate-cathode circuit of conductive tube V7 which permits a further rapid discharge of this capacitor and maintains the voltage at its upper terminal substantially at the low value which now appears at the plate of tube V7. Tube V9 continues to conduct steadily, therefore, so that relay VR remains picked up.

As the vehicle continues its progress and finally starts to pass out of the beam of sound pulses, the condition is finally reached again where both pavement and vehicle pulses are received alternately so that both amplifiers 17 and 18 apply alternate positive-going input pulses to the grids of tubes V6 and V7, respectively. This causes the flip-flop again to operate alternately between its opposite states so that the voltage at the plate of tube V7 varies repeatedly between high and low levels. Each time that tube V7 becomes non-conductive so that its plate voltage rises, this voltage increase appears also across the series combination of diode 53 and capacitor 46, but is not effective to charge capacitor 46 positively to any appreciable extent because of the high back resistance of diode 53. However, the mere fact that there is now no low voltage at the plate of tube V7 tending to maintain the voltage at the junction of diode 53 and resistor 52 at a correspondingly low level, makes it possible for capacitor 46 to charge through an alternative charging circuit which extends from (B+) and through resistor 52. Since the time constant for this charging circuit is relatively slow, capacitor 46 cannot become appreciably charged as long as the flip-flop keeps alternating between its opposite states, because the capacitor is quickly discharged through diode 53 each time that tube V7 becomes conductive.

However, when conditions finally are such that tube V7 remains non-conductive because only pavement reflection pulses are received, then capacitor 46 can become fully charged through resistor 52. When this happens, the relay control tube V9 becomes non-conductive so that relay VR is restored to its normal, dropped-away condition. Capacitor 46 is then again connected through back contact 48 and diode 47 to the plate of tube V7 so that it can quickly charge to the high voltage level then present at the plate of this tube.

As long as only pavement reflections are received, therefore, the flip-flop remains steadily in the condition wherein tube V7 is cut off and this results in relay VR being dropped away. When the other stable condition is reached such that only vehicle reflection pulses occur, then the flip-flop is in the opposite state wherein tube V7 is fully conductive and this results in the picking up of relay VR. However, rapid alternations of the flip-flop between its opposite states cannot result in operation of relay VR from its last-operated condition. In this way the high degree of discrimination which is achieved in the previously mentioned application Ser. No. 808,736 is here again achieved in that relay VR can pick up and close its front contact 54 to thereby energize counter 55 (see FIG. 2) only provided that vehicle reflections are received concurrently with the total absence of pavement reflections. Also, relay VR can thereafter drop away and de-energize counter 55 so as to permit its subsequent re-energization for another vehicle only when vehicle reflections are no longer received but pavement reflections are once again concurrently received.

The embodiment of FIG. 2 utilizes both the vehicle and pavement reflection pulses to detect the presence of each passing vehicle. There are many instances, however, where the extra degree of discrimination afforded by the use of both pavement and vehicle reflections is not necessary and it is then possible to organize the system so that it either uses only the pavement reflection pulses or only the vehicle reflection pulses. For example, if it is desired to use only the vehicle reflection pulses, then the gating means including the delay line may be employed to selectively discriminate between vehicle reflection pulses and all other pulses which are not vehicle reflection pulses and this is again accomplished by time gating means, i.e. by gating an amplifier which receives an input signal for each reflected sound pulse and gating this amplifier so that it can respond only to those pulses which occur within an interval which encompasses the expected arrival time of such vehicle reflection pulses. When this is desired, the circuit of FIG. 5 may be employed. Tube V1 then has its control grid connected directly to the output of the rectifier-filter 16 so that it receives a negative-going voltage pulse for each reflection pulse picked up by the receiving transducer RT. The plate of tube V1 is connected through resistor 56 to point A of FIG. 2, i.e. to the output of amplifier 35. As a result, tube V1 has energy applied to its plate-cathode circuit only throughout that interval of time when it is expected that vehicle reflection pulses may occur. Any output of the rectifier-filter 16 occurring throughout this interval and driving the control grid of tube V1 to cut off with respect to the cathode will permit the voltage at the plate of this tube to rise substantially to the level of voltage appearing at point A. Output pulses from the rectifier-filter 16 occurring at other times when the plate-cathode circuit is not so energized cannot produce this positive voltage at the plate of tube V1.

Each positive-going voltage variation at the plate of tube V1 is applied to the control grid of tube V2 and drives the control grid of this tube to the conductive region with respect to the cathode which is normally maintained at a positive potential by being connected to the junction of resistors 58 and 59 which are series connected between (B+) and ground. The resultant conduction of tube V2 abruptly lowers its plate potential because of increased voltage drop across resistor 62 and this results in a negative charging of capacitor 60 through diode 61 and variable capacitor 72. Each time that tube V2 becomes conductive in this manner, an additional negative charge is added to capacitor 60, thereby causing the control grid of tube V3 to go negative with respect to its grounded cathode.

Positive-going voltage variations also appear at the plate of tube V2 each time that it is restored to its normal nonconductive condition but these can have but little effect upon the voltage then appearing across capacitor 60 because of the high back resistance of rectifier 61. Instead, such positive-going voltage variations encounter a relatively low impedance path to ground through capacitor 72 and diode 63.

In between successive increments of negative charge, capacitor 60 tends to lose this negative charge, as a result of the connection through resistors 64 and 65 to the (B+) terminal. However, the high resistance of these resistors causes this to be a low time constant charging circuit so that the amount of charge that capacitor 60 loses between successive charges applied to it is relatively small. As a result, when successive input pulses cause tube V3 to become conductive, once for each sound pulse transmitted, capacitor 60 becomes increasingly negative so that tube V3 eventually becomes cut off. The circuit constants may, of course, be suitably adjusted so that any predetermined number of such occurrences will result in tube V3 reaching the cut off state. When this happens, relay VR included in its plate circuit drops away to thereby energize counter 55 through back contact 66.

When the vehicle departs from the sound beam, tube V2 no longer receives positive-going input pulses because the sound pulse reflections that produce negative-going voltage pulses at the grid of tube V1 do not then occur during the time that point A of FIG. 2 is applying a positive gating voltage through resistor 56 to the plate of tube V1. At such time, therefore, capacitor 60 loses its negative charge through resistors 64 and 65 so that tube V3 eventually is restored to its normal conductive state, thereby picking up relay VR and opening the circuit to the counter at contact 66 so that a subsequent count can be applied thereto.

Figure 5:
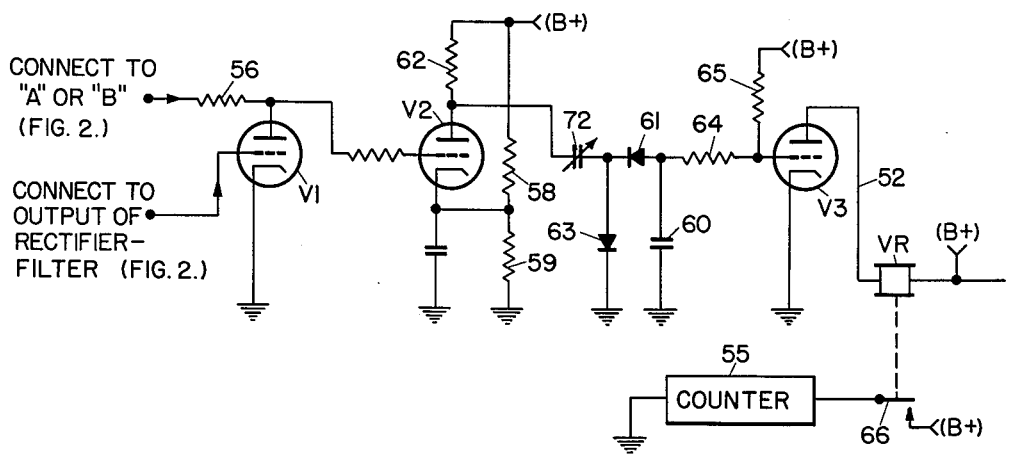
FIG. 5 illustrates an alternative embodiment of this invention utilizing only the vehicle reflection pulses.

It will be obvious that the circuit organization of FIG. 5 can also be employed when it is desired to detect vehicle presence merely as the result of the cessation of the normally received pavement reflection pulses. Thus, if the plate of tube V1 is connected through resistor 56 to point B of FIG. 2 rather than to point A, it is then clear that the plate-cathode circuit of this tube will be energized during that interval of time when it is expected that a pavement reflection pulse can be received. Under these circumstances, tube V2 will have a positive-going voltage pulse applied to its control grid for each pavement reflection pulse. At such time, capacitor 60 will become negatively charged, thereby cutting off tube V3 and causing relay VR to drop away. Thus, the normal situation will then be for relay VR to be in a released condition whenever no vehicle is present so that pavement reflection pulses are being received. Upon entry of a vehicle into the sound beam, the pavement reflection pulses will no longer occur. Tube V2 will then no longer be made conductive once for each transmitted sound pulse so that capacitor 60 will lose its negative charge and relay VR will then pick up as a result of the conduction of tube V3. Under these circumstances, a front contact of relay VR will be included in the circuit for the energization of the counter 55 so that the counter will be energized when relay VR picks up.

Having described a vehicle detector system employing a delay line to distinguish between sound pulses reflected from different reflecting surfaces, it should be understood that the embodiments illustrated are considered as being merely typical and that various modifications and alterations may be made to the specific forms shown without departing from the spirit or scope of this invention.

What I claim is:

1. In a system for detecting vehicles as they pass through a detection zone defined by a beam of repetitive sound pulses, the combination comprising, transmitting means for transmitting said beam of sound pulses, receiving means for receiving said pulses upon their being reflected from sound reflecting surfaces lying within a given range of distances from said transmitting means, said receiving means including an amplifier for amplifying said reflection pulses, gating means for controlling said amplifier to be responsive only throughout a limited time interval occurring for a predetermined time after the transmission of each sound pulse, output circuit means connected to the output of said amplifier and being controlled thereby to a distinctive condition to indicate the presence of a vehicle within said detection zone, said gating circuit means including a delay line being energized at one end thereof by said transmitting means at the time of transmission of each sound pulse, said delay line having a plurality of output taps closely spaced and connected in parallel, said taps being so positioned along said delay line that their common output comprises a gating signal which encompasses the expected reception time of reflection pulses from reflecting surfaces within said given range of distances, said signal acting upon said amplifier and controlling it to be responsive.

2. The system according to claim 1 wherein said delay line is an acoustic delay line and said output taps comprise electro-acoustic transducers.

3. The system according to claim 1 wherein said gating signal encompasses the interval throughout which reflection pulses can be expected by said receiving means from a vehicle within said detection zone, said output means being controlled to said distinctive condition by the occurrence of successive outputs from said amplifier to provide thereby an indication of the presence of said vehicle within said detection zone.

4. The system of claim 1 wherein said gating signal encompasses the interval through out which reflection pulses can be expected by said receiving means from a fixed reflecting surface more distant than said vehicles from said transmitting means and in front of which said vehicles pass as they move through said detection zone, and the absence of output pulses from said amplifier for a predetermined length of time provides a distinctive indication of the presence of a vehicle.

5. In a system for detecting the presence of a vehicle as it passes through a detection zone defined by at least one beam of repetitive sound pulses directed across said zone and impinging in the absence of any vehicle within said zone upon a fixed sound reflecting surface the combination comprising, transmitting means for transmitting said pulses, receiving means for receiving said pulses reflected both from said vehicle within said zone and from said fixed reflecting surface, said transmitting means transmitting said sound pulses with a period at least equalling the round-trip propagation time of a sound pulse between said transmitting and said receiving means when reflected from said fixed reflecting surface, gating circuit means including a delay line receiving an input signal substantially at the time of transmission of each said sound pulse, said delay line having a first plurality of closely spaced output taps which are successively energized throughout a first interval being coextensive with the expected reception of reflection pulses from reflecting surfaces of vehicles within said detection zone, said delay line also having a second plurality of closely spaced output taps which are successively energized throughout a second interval being coextensive with the expected reception of reflection pulses from said fixed reflecting surface, said receiving means being controlled by the output of said first plurality of output taps to provide a first distinctive output signal for each reflection pulse received during said first interval, said receiving means being controlled by the output of said second plurality of output taps to provide a second distinctive output signal for each reflection pulse received by said receiving means during said second interval, and means being controlled by said first and second output signals, respectively, to indicate the passage of a vehicle through said detection zone.

6. The invention as defined in claim 5 wherein said delay line is an acoustic delay line and each of said output taps comprises an electro-acoustic transducers.

7. The combination of claim 6 wherein all said output taps included in said first and second plurality of output taps, respectively, are connected in parallel to an integrating means, whereby a substantially steady voltage appears across the respective integrating means throughout the corresponding first or second interval.

8. The invention as defined in claim 6 wherein said receiving means includes a first and second amplifier each receiving an input signal for each received reflection pulse, said output of said first plurality of output taps being applied as a gating voltage to said first amplifier, and said output of said second plurality of output taps being applied as a gating voltage to said second amplifier means.

References Cited in the file of this patent
UNITED STATES PATENTS

| | | |
|---|---|---|
| 2,446,224 | Richmond | Aug. 3, 1948 |
| 2,524,779 | Dodington | Oct. 10, 1950 |
| 2,560,587 | Miller | July 17, 1951 |
| 2,815,490 | Faymoreau | Dec. 3, 1957 |
| 2,922,107 | Kushner | Jan. 19, 1960 |